Figure 1:
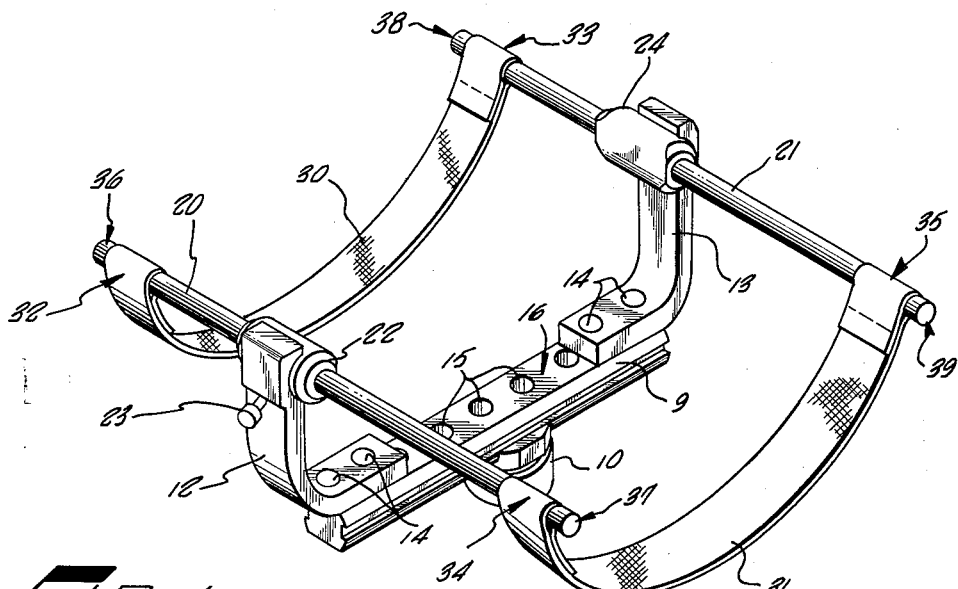

June 4, 1963     C. J. STREBEL ETAL     3,092,079

GROOMING TABLE

Filed April 12, 1962

INVENTORS.
CHARLES J. STREBEL
THEODORE MARKUS
BY Christie, Parker & Dale
ATTORNEYS.

United States Patent Office 3,092,079
Patented June 4, 1963

3,092,079
GROOMING TABLE
Charles J. Strebel, 1628 10th Ave., Arcadia, Calif., and Theodore Markus, 17940 Valley Vista Blvd., Encino, Calif.
Filed Apr. 12, 1962, Ser. No. 186,884
9 Claims. (Cl. 119—103)

This invention relates to an improved table for holding animals while grooming and other services are performed upon them.

Although this invention will be described herein with reference to the preferred embodiment thereof for use in assisting in the grooming of pets, it will be apparent that the apparatus disclosed may also be used for veterinary purposes, such as the administration of drugs and treatment of wounds upon small animals.

In grooming a small animal, for example in the trimming of poodles, it is necessary that the animal be held at a convenient height and location and be restrained from moving therefrom. It is also desirable that the animal be held in such manner as to avoid excitement, uncomfort, or harm to the animal. It is further desirable that as much of the animal's body as possible be accessible to the person performing the grooming, and be free from straps, harnesses, and the like.

Heretofore, apparatus has been employed on a table to hold the animal above the surface in order to prevent its feet from touching the table to give leverage for springing free. However, none of such apparatus has been able to hold the animal comfortably, and the use of straps over the back of the animal has been required, often frightening the animal and usually interfering with the groomer's work. Certain of such apparatus has been non-rotatable, thus requiring the groomer to walk from one side of the table to the other in order to reach the opposite side of the animal.

Furthermore, known devices for securing an animal on a table have not heretofore provided a means for holding an animal which conforms to the normal configuration of the animal, that is, which allows for the normally large chest and comparatively small abdomen. For example, a substantially level saddle has heretofore been used, but does not permit the animal itself to be level, because of its large chest, and an animal so held assumes an unnatural, tilted, and uncomfortable attitude. Further, such saddles have not been adjustable to permit comfortable support to the undersides of both large and small animals.

Other disadvantages of prior apparatus have been the inability of the apparatus to be operated with one hand while the other hand of the groomer holds and steadies the animal, and the further failure to provide an easily removable holding apparatus, to permit use of the table for other purposes.

The present invention resolves these difficulties and provides a removable, easily operated apparatus which is adjustable to securely and comfortably support varying sizes of animals, without the use of straps over the backs of the animals.

In the present invention, a conventionally shaped table is provided. A vertical shaft is carried by the table and extends above the surface of the table top. Means for raising and lowering the shaft are provided, and the shaft is removable from the table. A pair of substantially identical side members extend above the top of the shaft and are rotatable about the longest axis of the shaft. Means are provided for selectively varying the distance between the side members, which are disposed on opposite sides of the shaft, for accommodating differing widths of animals between the side members.

First and second elongated strap-carrying members are each carried by one of the side members. The strap-carrying members are disposed substantially parallel to each other and parallel to the top surface of the table.

First and second flexible straps are provided to support the underside of an animal being held between the strap-carrying members. Each flexible strap has ends adapted to be attached to the strap-carrying members, each strap being carried by one end of each of the first and second strap-carrying members. The lengths of the flexible straps are adapted to fit the underside of an animal held between the strap-carrying members. As various lengths of straps may be required for different sized animals, and also as a result of varying the distance between the side members to accommodate larger and smaller animals, the flexible straps are adjustable in length, or a plurality of lengths of straps may be provided, and straps of desired length selected and attached to the strap-carrying members.

Means are provided to vary the distance between the flexible straps, in order to accommodate animals of different lengths. Such means are adapted to vary the distance between the ends of each strap-carrying member, and telescoping strap-carrying members may be used, or a plurality of strap-carrying members having varying lengths may be provided, and proper lengths selected and attached to the side members.

Means are also provided for raising and lowering the vertical shaft to desired elevations, and holding the shaft at such elevation while the work on an animal progresses.

In operation, the side members are separated to the desired width to fit the animal to be supported, and the flexible straps are accordingly adjusted in length. The strap-carrying members are adjusted for the length desired to permit the longer flexible strap to be positioned around the chest of the animal, immediately behind the front legs, and the shorter strap to be positioned around its abdomen, immediately in front of the rear legs. Thus, the animal is comfortably positioned according to his own dimensions, and is not precariously or uncomfortably balanced upon a fixed size of saddle which may be too long, too short, or too narrow to properly hold him. Such individualized positioning has in practice been found to reassure and quiet the animals during grooming.

Figure 2:
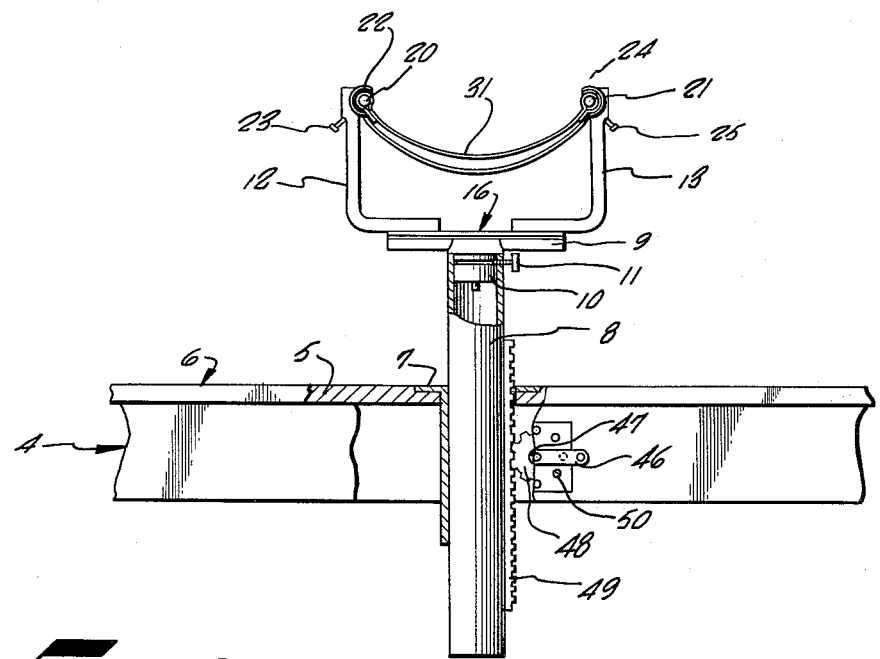

This invention will be more clearly understood with reference to the accompanying drawings, in which:

FIG. 1 is a perspective view of a bracket and assembly carried by the bracket in accordance with the present invention, and FIG. 2 is a partial cross-sectional view of a grooming table in accordance with the present invention, with portions of the table cut away.

Referring now to the drawings, in the preferred embodiment of the invention there is provided a conventionally-shaped table indicated generally at 4 having a top 5 forming a level horizontal top surface 6. For grooming tables, the top surface 6 is made from a rough, coarse material, the presence of which removes fears of slipping from an animal standing thereon, but for veterinary tables, a smooth stainless steel construction may be preferred. An annular collar 7 is mounted through the table top 5 and a vertical shaft 8 is passed therethrough. The vertical shaft 8 in the preferred form is hollow tubing and is perpendicular to the top surface 6.

An elongated bracket 9 which includes rotatable mounting means 10 is carried at the top of the vertical shaft 8. The rotatable mounting means 10 is adapted to rotatably fit within the interior of the vertical shaft 8, to rotate the bracket about the longitudinal axis of vertical shaft 8, and may be secured at any desired position of rotation by a thumbscrew 11 or other suitable means. The bracket 9 is shaped to have a top surface 16, which may be called a reference surface, which is substantially parallel to the top surface 6 of the table.

A first side member 12 is carried at one end of the bracket 9, and a substantially identical second side member 13 is carried at the other end of the bracket 9. Each of the side members 12 and 13 in the preferred form has two pegs 14 which project downwardly therefrom toward the top surface 16 of the bracket 9. The top surface 16 of the bracket 9 defines a plurality of holes 15 adapted to receive the pegs 14. Each of the holes 15 is separated from adjacent holes 15 by the same distance as that between the two pegs 14 carried by each of side members 12 and 13, and the pegs 14 and holes 15 are arranged along a reference line passing through the projection of the longitudinal axis of the vertical shaft 8. Thus, the two pegs 14 on each of the side members 12 and 13 may be inserted into any two adjacent holes 15 along the reference line, and by lifting the side members 12 and 13 from the bracket 9 and reinserting the pegs 14 in the desired holes 15, the distance between the two side members 12 and 13 may be selectively varied. Bracket 9 is of sufficient length and contains a sufficient number of holes 15 to receive the side members 12 and 13 when they are separated by the maximum desired distance. It should be understood that other forms of construction may be employed to achieve apparatus within the concept of this invention, that is, a pair of side members rotatable about the longitudinal axis of vertical shaft 8 wherein the distance between the two side members may be selectively varied.

First and second elongated strap-carrying members 20 and 21 are provided, and are carried by first and second side members 12 and 13, respectively. In the preferred form the strap-carrying members 20 and 21 are each cylindrical rods and are passed through brackets 22 and 24, respectively, at the upper ends of side members 12 and 13. Brackets 22 and 24 are slightly larger in inner diameter than rods 20 and 21 to permit easy removal of the rods therefrom. Thumbscrew 23 is used to hold rod 20 in position in bracket 22, and thumbscrew 25 holds rod 21 in bracket 24. Thumbscrews 23 and 25 may be replaced by other suitable fastening means, such as ball springs adapted to fit into notches formed in rods 20 and 21. The strap-carrying members, or rods, 20 and 21 are positioned parallel to each other, parallel to the top surface 6 of the table 4, and perpendicular to a reference plane, the reference plane being a plane perpendicular to the top surface 6 of the table 4 and including on its surface the reference line defined by rods 14, holes 15, and a point on the projection of the longitudinal axis of vertical shaft 8. The ends of strap-carrying member 20, indicated generally at 36 and 37, are disposed on opposite sides of the reference plane, and the ends of strap-carrying member 21, indicated generally at 38 and 39, are similarly disposed.

A first flexible strap 30, with end portions indicated generally at 32 and 33 adapted to fit around strap-carrying members 20 and 21, is carried at one end 32 by end 36 of strap-carrying member 20 on one side of the reference plane, and at the other end 33 by the end 38 of strap-carrying member 21 disposed on the same side of the reference plane. Second flexible strap 31 is disposed on the other side of the reference plane, substantially parallel to strap 30, with one end indicated generally at 34 carried by end 37 of first strap-carrying member 20 and the other end 35 carried by end 39 of second strap-carrying member 21.

In the preferred form, first strap 30 is longer than second strap 31 so that when an animal is placed between side members 12 and 13, facing in the directions of ends 36 and 38 of strap-carrying members 20 and 21, strap 30 will support the underside of the chest of the animal, and strap 31 will support the underside of the abdomen of the animal, which is normally smaller than the chest. Because of its shorter length, strap 31 is higher than strap 30, as can be seen especially in FIG. 2, and the animal is thus held in a substantially level position.

Differing lengths of straps 30 and 31 are required as the distance between the side members 12 and 13 is varied, and the straps 30 and 31 may therefore be made adjustable in length. In the presently preferred form, however, a plurality of straps of differing lengths (not shown) are provided, the range of lengths depending upon the maximum distance by which it is desired to separate the side members 12 and 13, and two straps of suitable length are selected by the groomer and attached to the ends of strap-carrying members 20 and 21. The provision of a plurality of straps permits use of sewed end portions, eliminating the necessity for buckles or snaps, which often tend to catch and pull the hair of the animal being supported, as would be required on adjustable straps.

Means are provided for varying the distance between the two flexible straps 30 and 31. Although this can be accomplished by using long strap-carrying members 20 and 21 and sliding the ends of the straps 30 and 31 therealong, it is desired in the preferred form that the ends of the straps 30 and 31 be closely adjacent the ends of the strap-carrying members 20 and 21, in order to eliminate projecting rod end portions which could cause injury or discomfort to the animal being held. Thus, it is provided that the distance between the ends of each of the strap-carrying members 20 and 21 is adjustable. The members 20 and 21 may be made to telescopingly lengthen and shorten. However, it has been found that for average grooming usage the length must be variable from 6 to 12 inches. In telescoping construction, the member has the weakest load-carrying capacity when extended to full length, but at such length is required to support the heaviest animals. Therefore, in the preferred form, a plurality of lengths of rods for strap-carrying members 20 and 21 are provided within the range of distances which may be desired. When it is desired to separate the straps 30 and 31 by a greater or lesser distance, the straps 30 and 31 are removed from the strap-carrying members 20 and 21, the members 20 and 21 are removed from brackets 22 and 24, and a new pair of rods are selected of the desired length for strap-carrying members 20 and 21, and inserted into the brackets 22 and 24. Normally, the side members 12 and 13 are simultaneously adjusted in position and new lengths of flexible straps 30 and 31 are selected and attached.

Thus, the supporting assembly is adjustable to fit both varying widths and varying lengths of animals to provide a "personalized" comfortable support to the underside of each animal.

In use, the animal is placed on the table top surface 6 with the vertical shaft 8 and assembly carried thereon in a lowered position. A crank 46 is then turned with one hand while the groomer's other hand steadies the animal. The crank 46 is connected to shaft 47 which in turn rotates gear 48. A gear rack 49 is attached to one side of vertical shaft 8 and is positioned to engage the gear 48 which, through rotation, raises and lowers gear rack 49, and thus vertical shaft 8. A plurality of stopping devices 50 of any conventional type are provided to lock the crank in place at any desired rotational position when vertical shaft 8 has reached the desired elevation. It has been found that an animal is most comfortably and securely supported when he is raised until his weight principally rests on straps 30 and 31, but his feet may still partially touch the table top surface 6. He cannot get sufficient grip upon the table to move himself, and thus is securely held by the apparatus without the use of straps over the back of the animal.

The vertical shaft 8 may be lifted from the collar 7 and completely removed from the table 4. A suitable covering device (not shown) may be placed over the top of the collar 7, leaving a substantially level table top surface 6 when the supporting apparatus is not in use.

There has thus been disclosed a safe and comfortable grooming table which is relatively inexpensive to manufacture.

We claim:
1. A grooming table, comprising:
 (a) a table having a top surface,
 (b) a vertical shaft carried by the table and extending above the top surface of the table,
 (c) means for raising and lowering the vertical shaft,
 (d) first and second elongated strap-carrying members carried by the vertical shaft disposed parallel to each other and parallel to the top surface of the table, and being rotatable about the longitudinal axis of the vertical shaft,
 (e) first and second elongated flexible straps for supporting the underside of an animal between the strap-carrying members,
 (f) each flexible strap having one end attached to the first strap-carrying member and one end attached to the second strap-carrying member, the straps being disposed substantially parallel to each other,
 (g) means for selectively varying the distance between the first and second strap-carrying members, and
 (h) means for selectively varying the distance between the first and second flexible straps.

2. A grooming table, comprising:
 (a) a table having a top surface,
 (b) a vertical shaft carried by the table and extending above the top surface of the table,
 (c) means for raising and lowering the vertical shaft,
 (d) first and second substantially identical side members carried by the vertical shaft, arranged to extend upwardly above the top of the vertical shaft and to be rotatable about the longitudinal axis of the vertical shaft,
 (e) the side members being disposed on opposite sides of the vertical shaft to define two points on a reference line passing through the projection of the longitudinal axis of the vertical shaft,
 (f) the reference line being parallel to the top surface of the table and also lying on a reference plane, the reference plane being substantially perpendicular to the top surface of the table,
 (g) means for selectively varying the distance between the side members,
 (h) first and second elongated flexible straps adapted to support the underside of an animal,
 (i) first and second elongated strap-carrying members, each carried by a side member,
 (j) the strap-carrying members being disposed substantially parallel to the top surface of the table, parallel to each other, and perpendicular to the reference plane,
 (k) each strap-carrying member having its ends disposed on opposite sides of the reference plane,
 (l) means for securing the strap-carrying members to the side members,
 (m) the ends of the flexible straps being adapted to be attached to the strap-carrying members,
 (n) an end of the first flexible strap being attached to an end of the first strap-carrying member on one side of the reference plane, and the other end of the first flexible strap being attached to the end of the second strap-carrying member on the same side of the reference plane, the second flexible strap being attached to the remaining ends of the first and second strap-carrying members, on the other side of the reference plane, both flexible straps being arranged to be substantially parallel to the reference plane,
 (o) means for selectively varying the distance between the first and the second flexible straps.

3. A grooming table, comprising:
 (a) a table having a top surface,
 (b) a vertical shaft carried by the table and extending above the top surface of the table,
 (c) means for raising and lowering the vertical shaft,
 (d) a bracket rotatably mounted on the upper end of the vertical shaft, the bracket being shaped to define a reference surface substantially parallel to the top surface of the table,
 (e) first and second substantially identical side members carried by the bracket arranged to extend upwardly above the bracket and disposed on opposite sides of the vertical shaft to define two points on a reference line passing through the projection of the longitudinal axis of the vertical shaft,
 (f) the reference line being parallel to the reference surface and also lying on a reference plane, the reference plane being substantially perpendicular to the top surface of the table,
 (g) means for adjustably securing the side members to the bracket along the reference surface, adapted to permit adjustment of the distance between the side members,
 (h) first and second elongated flexible straps adapted to support the underside of an animal,
 (i) first and second elongated strap-carrying members, each carried by a side member,
 (j) the strap-carrying members being disposed substantially parallel to the top surface of the table, parallel to each other, and perpendicular to the reference plane,
 (k) each strap-carrying member having its ends disposed on opposite sides of the reference plane,
 (l) means for securing the strap-carrying members to the side members,
 (m) the ends of the flexible straps being adapted to be attached to the strap-carrying members,
 (n) an end of the first flexible strap being attached to an end of the first strap-carrying member on one side of the reference plane, and the other end of the first flexible strap being attached to the end of the second strap-carrying member on the same side of the reference plane, the second flexible strap being attached to the remaining ends of the first and second strap-carrying members, on the other side of the reference plane, both flexible straps being arranged to be substantially parallel to the reference plane,
 (o) means for selectively varying the distance between the first and the second flexible straps.

4. A grooming table according to claim 3 wherein the means for adjustably securing the side members to the bracket comprises:
 (a) a portion of each side member adapted to rest on the reference surface of the bracket,
 (b) the reference surface of the bracket being of a sufficient length along the reference line to engage the portions of the side members adapted to rest on the reference surface at times when the side members are separated by the maximum desired distance,
 (c) securing means adapted to permit the portion of each side member adapted to rest on the reference surface of the bracket to be secured to the reference surface of the bracket at a plurality of positions along the reference line.

5. Apparatus according to claim 3 wherein the flexible straps are adapted to be adjustable in length.

6. A grooming table according to claim 3 wherein the first flexible strap is longer than the second flexible strap, the first flexible strap being adapted to fit the underside of the chest of an animal and the second flexible strap being adapted to fit the underside of the lower abdomen of an animal.

7. A grooming table according to claim 3 wherein the means for selectively varying the distance between the first and second flexible straps comprises means for lengthening and shortening the length of the first and second strap-carrying members.

8. A grooming table according to claim 3 wherein the means for raising and lowering the vertical shaft comprises:
 (a) a gear rack attached to a side of the vertical shaft,
 (b) gear means adapted to engage the gear rack,
 (c) crank means adapted to rotate the gear means,
 (d) locking means adapted to releasably lock the cranking means to hold the vertical shaft at desired elevations.

9. Apparatus according to claim 3 wherein the vertical shaft is adapted to be removable from the table.

References Cited in the file of this patent

UNITED STATES PATENTS

| | | |
|---|---|---|
| 293,839 | Addison | Feb. 19, 1884 |
| 492,819 | Milnes | Mar. 7, 1893 |
| 2,536,268 | Dillon | Jan. 2, 1951 |
| 2,773,477 | Michael | Dec. 11, 1956 |
| 3,058,711 | Kingsford | Oct. 16, 1962 |